US012021222B2

(12) United States Patent
Tanimoto et al.

(10) Patent No.: US 12,021,222 B2
(45) Date of Patent: Jun. 25, 2024

(54) POSITIVE ELECTRODE FOR ALKALI SECONDARY BATTERY, AND ALKALI SECONDARY BATTERY INCLUDING SAID POSITIVE ELECTRODE

(71) Applicant: FDK CORPORATION, Tokyo (JP)

(72) Inventors: Yuya Tanimoto, Tokyo (JP); Yuzo Imoto, Tokyo (JP); Tetsuya Yamane, Tokyo (JP); Masaru Kihara, Tokyo (JP); Hideyuki Asanuma, Tokyo (JP)

(73) Assignee: FDK CORPORATION, Tokyo (JP)

( * ) Notice: Subject to any disclaimer, the term of this patent is extended or adjusted under 35 U.S.C. 154(b) by 622 days.

(21) Appl. No.: 17/274,772

(22) PCT Filed: Aug. 15, 2019

(86) PCT No.: PCT/JP2019/032000
§ 371 (c)(1),
(2) Date: Mar. 9, 2021

(87) PCT Pub. No.: WO2020/054307
PCT Pub. Date: Mar. 19, 2020

(65) Prior Publication Data
US 2022/0052317 A1 Feb. 17, 2022

(30) Foreign Application Priority Data
Sep. 12, 2018 (JP) .................. 2018-170657

(51) Int. Cl.
*H01M 4/32* (2006.01)
*H01M 4/36* (2006.01)
(Continued)

(52) U.S. Cl.
CPC ............. *H01M 4/32* (2013.01); *H01M 4/366* (2013.01); *H01M 4/383* (2013.01); *H01M 4/52* (2013.01); *H01M 4/62* (2013.01); *H01M 10/30* (2013.01)

(58) Field of Classification Search
None
See application file for complete search history.

(56) References Cited

U.S. PATENT DOCUMENTS

2004/0265689 A1* 12/2004 Ochi .................. H01M 4/366
429/223
2017/0237066 A1* 8/2017 Imoto .................. H01M 4/52
429/163

FOREIGN PATENT DOCUMENTS

EP 2645457 A1 10/2013
EP 2669973 A1 12/2013
(Continued)

OTHER PUBLICATIONS

International Search Report and Written Opinion dated Nov. 5, 2019, for corresponding PCT Application No. PCT/JP2019/032000.
(Continued)

Primary Examiner — Wyatt P McConnell
(74) Attorney, Agent, or Firm — Kinney & Lange, P.A.

(57) ABSTRACT

A battery 2 includes an outer can 10 and an electrode group 22 that is housed in the outer can 10 together with an alkaline electrolytic solution, in which a positive electrode 24 included in the electrode group 22 includes a positive electrode substrate and a positive electrode mixture supported on the positive electrode substrate, the positive electrode mixture includes nickel hydroxide, yttrium oxide serving as a first additive, and niobium oxide or titanium oxide serving as a second additive, a total amount of the first additive and the second additive is 0.1 parts by mass or more and 2.5 parts by mass or less per 100 parts by mass of the (Continued)

nickel hydroxide, a mass ratio of the first additive and the second additive is in a relationship of 1:0.2 to 5, and the positive electrode mixture after an activation treatment has a resistivity of 1 Ω·m or more and 10 Ω·m or less.

3 Claims, 2 Drawing Sheets

(51) Int. Cl.
*H01M 4/38* (2006.01)
*H01M 4/52* (2010.01)
*H01M 4/62* (2006.01)
*H01M 10/30* (2006.01)

(56) References Cited

FOREIGN PATENT DOCUMENTS

| | | |
|---|---|---|
| EP | 3163668 A1 | 5/2017 |
| JP | 2004031292 A | 1/2004 |
| JP | 2005056733 A | 3/2005 |
| JP | 2007149647 A | 6/2007 |
| JP | 2015130249 A | 7/2015 |

OTHER PUBLICATIONS

Supplementary European Search Report dated May 17, 2022, for corresponding European Application No. 19859553.0.

* cited by examiner

POSITIVE ELECTRODE FOR ALKALI SECONDARY BATTERY, AND ALKALI SECONDARY BATTERY INCLUDING SAID POSITIVE ELECTRODE

CROSS-REFERENCE TO RELATED APPLICATION(S)

This application is the national phase of PCT Application No. PCT/JP2019/032000 filed on Aug. 15, 2019, which in turn claims priority to Japanese Application No. 2018-170657 filed on Sep. 12, 2018, both of which are incorporated by reference herein in their entireties.

TECHNICAL FIELD

The present disclosure relates to a positive electrode for an alkali secondary battery, and an alkali secondary battery including the positive electrode.

BACKGROUND ART

Nickel hydroxides are used for positive electrode active materials in positive electrodes for use in alkali secondary batteries. Such nickel hydroxides are low in conductivity, and thus have a difficulty in singly enhancing the rate of utilization of positive electrode active materials. Conductive materials are then generally utilized in order to impart conductivity. Aspects for utilization of such a conductive material include an aspect where a powder as an aggregate of a conductive material particle is added into a positive electrode mixture and an aspect where a conductive material layer, namely, a conductive layer is formed on the surface of each nickel hydroxide particle. Such aspects are utilized singly or in combinations thereof.

In the aspect where a conductive material powder is added into a positive electrode mixture, one or more selected from, for example, a cobalt compound such as cobalt oxide (CoO) or cobalt hydroxide ($Co(OH)_2$), and cobalt (Co) can be used for a conductive material. A particle of such a conductive material and a particle of nickel hydroxide are contacted with each other to thereby form a conductive network.

On the other hand, in the aspect where a conductive layer is formed on the surface of each nickel hydroxide particle, the conductive layer is formed by precipitating a cobalt compound on the surface of each nickel hydroxide particle. In this case, the conductive layer on the surface of each nickel hydroxide particle is mutually contacted to thereby form a conductive network.

Positive electrodes are thus enhanced in conductivity, and positive electrode active materials are accordingly enhanced in rate of utilization.

Alkali secondary batteries are increasingly used in applications where such batteries are used in the form of battery packs obtained by combining a plurality of alkali secondary batteries. Examples include driving power sources for electric cars, electricity storage systems of renewable energy, and backup power sources for measures of power failures. Such battery packs, as being charged and discharged, cause reaction heat and/or Joule heat to be generated due to battery reaction, are easily increased in temperature, and are exposed to high temperatures, in many cases. Alkali secondary batteries have been increasingly used recently under a severer environment, for example, a high-temperature environment according to further expansion of applications. In particular, such batteries may be sometimes left to still stand and over-discharged with being connected with any load under a high-temperature environment.

If alkali secondary batteries are thus over-discharged, in particular, cobalt compounds described above are reduced to cause conductive networks to be broken, sometimes resulting in failures including a decrease in charge efficiency and deterioration in characteristics of such batteries left to still stand.

It is considered to be effective for avoidance of such failures that reduction of cobalt compounds is suppressed. There are made various researches about methods for suppressing reduction of cobalt compounds. One known example of the methods for suppressing reduction of cobalt compounds is addition of a compound of Ti, Nb, Y, Yb and/or the like to a positive electrode mixture (see, for example, Patent Document 1). In other words, such a compound of Ti, Nb, Y, Yb and/or the like can be added as a positive electrode additive, to a positive electrode mixture, thereby keeping less breakage of a conductive network, and thus an alkali secondary battery is, for example, suppressed in a decrease in charge efficiency.

PRIOR ART DOCUMENT

Patent Document

Patent Document 1: Japanese Patent Laid-Open No. 2004-031292

SUMMARY

The above positive electrode additive is low in conductivity, by itself, and may sometimes have any influence on discharge characteristics of a battery, in particular, may sometimes cause deterioration in discharge characteristics in the case of discharge of a battery at a high rate. Specifically, the above positive electrode additive, when added to a positive electrode, less causes deterioration in discharge characteristics of a battery, for example, in the case of discharge at a rate of about 1 C. However, there is caused significant deterioration in discharge characteristics of a battery in the case of discharge at a higher high rate, for example, a rate of 3 C.

Thus, there is a demand for development of an alkali secondary battery which can be suppressed in deterioration in discharge characteristics even at the above-mentioned high rate.

The present disclosure has been made in view of the above circumstances, and an object thereof is to provide a positive electrode for an alkali secondary battery which can be suppressed in deterioration in discharge characteristics at a high rate even when a positive electrode additive for retention of a conductive network is contained, as well as an alkali secondary battery including the positive electrode.

The present disclosure provides a positive electrode for an alkali secondary battery, including a positive electrode substrate and a positive electrode mixture supported on the positive electrode substrate, wherein the positive electrode mixture includes nickel hydroxide serving as a positive electrode active material, a positive electrode additive, and a conductive material, the positive electrode additive includes a first additive and a second additive, a total amount of the first additive and the second additive is 0.1 parts by mass or more and 2.5 parts by mass or less per 100 parts by mass of the nickel hydroxide, a mass ratio of the first additive and the second additive is in a relationship of $X:Y=1:0.2$ to 5 when a mass of the first additive is X and a mass of the second additive is Y, the positive electrode mixture after an activation treatment has a resistivity of 1 Ω·m or more and 10 Ω·m or less, the nickel hydroxide includes at least one of nickel oxyhydroxide and nickel hydroxide, the first additive is yttrium oxide, and the second additive includes at least one of niobium oxide and titanium oxide.

The conductive material is preferably configured to be included in the positive electrode mixture, in the form of at least one of a particle thereof and a surface layer formed on a particle surface of the nickel hydroxide.

The present disclosure further provides an alkali secondary battery including an outer can and an electrode group that is housed in the outer can together with an alkaline electrolytic solution, wherein the electrode group includes a positive electrode and a negative electrode stacked with a separator being interposed therebetween, and the positive electrode is any one of the above positive electrodes for an alkali secondary battery.

The negative electrode is preferably configured to include a hydrogen storage alloy capable of storing and releasing hydrogen, as a negative electrode active material.

The positive electrode for an alkali secondary battery of the present disclosure includes a positive electrode substrate and a positive electrode mixture supported on the positive electrode substrate, in which the positive electrode mixture includes nickel hydroxide serving as a positive electrode active material, a positive electrode additive, and a conductive material, the positive electrode additive includes a first additive and a second additive, the total amount of the first additive and the second additive is 0.1 parts by mass or more and 2.5 parts by mass or less per 100 parts by mass of the nickel hydroxide, the mass ratio of the first additive and the second additive is in a relationship of X:Y=1:0.2 to 5 when the mass of the first additive is X and the mass of the second additive is Y, the positive electrode mixture after an activation treatment has a resistivity of 1 Ω·m or more and 10 Ω·m or less, the nickel hydroxide includes at least one of nickel oxyhydroxide and nickel hydroxide, the first additive is yttrium oxide, and the second additive includes at least one of niobium oxide and titanium oxide. An alkali secondary battery including the positive electrode using the positive electrode additive satisfying the above-mentioned conditions can be suppressed in deterioration in discharge characteristics at a high rate.

DETAILED DESCRIPTION

Hereinafter, an alkali secondary battery to which the present disclosure is applied is described with reference to the drawings. The alkali secondary battery to which the present disclosure is applied is not particularly limited, and a case is described by way of example, where the present disclosure is applied to an AA-size cylindrical nickel-hydrogen secondary battery (hereinafter, referred to as "battery") 2 as illustrated in FIG. 1.

Figure 1:
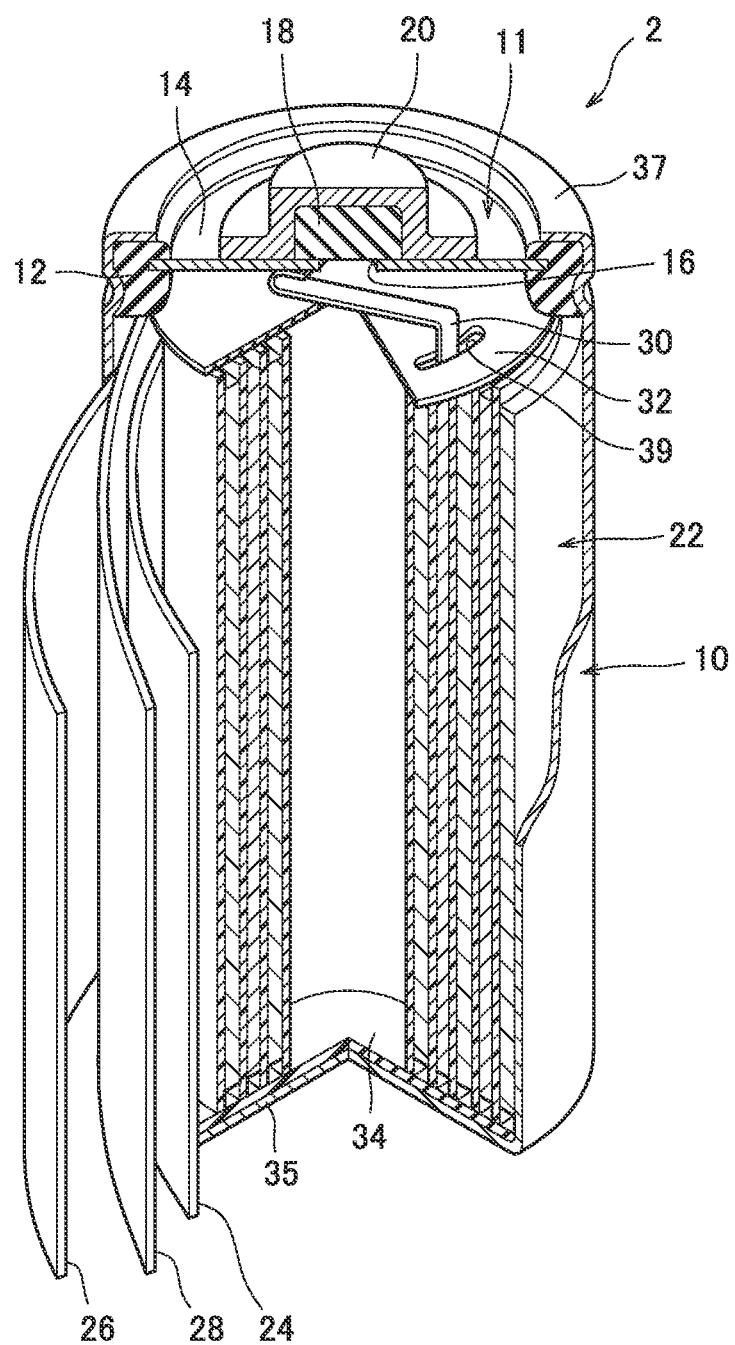
FIG. 1 is a perspective view illustrating a nickel-hydrogen secondary battery according to one embodiment of the present disclosure, in a partially broken manner.

The battery 2 includes a bottomed cylindrical outer can 10 opened at the upper end thereof, as illustrated in FIG. 1. The outer can 10 has conductivity, and a bottom wall 35 thereof serves as a negative electrode terminal. A sealing body 11 is secured in the opening of the outer can 10. The sealing body 11 includes a lid plate 14 and a positive electrode terminal 20, and not only seals the outer can 10, but also provides the positive electrode terminal 20. The lid plate 14 is a disc-shaped member having conductivity. The lid plate 14 and a ring-shaped insulation packing 12 that surrounds the lid plate 14 are disposed in the opening of the outer can 10, and the insulation packing 12 is secured to an opening edge 37 of the outer can 10 by swaging the opening edge 37 of the outer can 10. That is, the lid plate 14 and the insulation packing 12 cooperate with each other to thereby airtightly close the opening of the outer can 10.

The lid plate 14 here has a central through-hole 16 at the center thereof. A rubber valve body 18 that plugs the central through-hole 16 is disposed on an outer surface of the lid plate 14. A metallic positive electrode terminal 20 having a flanged cylindrical shape is electrically connected onto the outer surface of the lid plate 14 so as to cover the valve body 18. The positive electrode terminal 20 pushes the valve body 18 towards the lid plate 14. The positive electrode terminal 20 here has a vent hole opened, not illustrated.

The central through-hole 16 is airtightly closed by the valve body 18 in normal times. When any gas is generated in the outer can 10 and the internal pressure is increased, the valve body 18 is compressed by the internal pressure to open the central through-hole 16, thereby allowing such any gas to be outwardly released from the outer can 10 through the central through-hole 16 and the vent hole (not shown) of the positive electrode terminal 20. In other words, the central through-hole 16, the valve body 18 and the positive electrode terminal 20 form a safety valve for a battery.

The outer can 10 receives an electrode group 22. The electrode group 22 includes belt-shaped positive electrode 24, negative electrode 26 and separator 28, and is spirally wound in the state where the separator 28 is sandwiched between the positive electrode 24 and the negative electrode 26. That is, the positive electrode 24 and the negative electrode 26 are stacked on each other with the separator 28 being interposed therebetween. The outermost periphery of the electrode group 22 is formed by one portion (outermost peripheral portion) of the negative electrode 26, and is in contact with an inner peripheral wall surface of the outer can 10. That is, the negative electrode 26 and the outer can 10 are electrically connected to each other.

A positive electrode lead 30 is disposed between one end of the electrode group 22 and the lid plate 14, in the outer can 10. Specifically, the positive electrode lead 30 is connected to the positive electrode 24 at one end thereof and is connected to the lid plate 14 at other end thereof. Accordingly, the positive electrode terminal 20 and the positive electrode 24 are electrically connected to each other via the positive electrode lead 30 and the lid plate 14. A round upper insulation member 32 is disposed between the lid plate 14 and the electrode group 22, and the positive electrode lead 30 extends through a slit 39 provided in the upper insulation member 32. A round lower insulation member 34 is also disposed between the electrode group 22 and the bottom of the outer can 10.

A predetermined amount of an alkaline electrolytic solution (not shown) is injected into the outer can 10. The alkaline electrolytic solution, with which the electrode group 22 is impregnated, progresses a charge/discharge reaction between the positive electrode 24 and the negative electrode 26. The alkaline electrolytic solution here used is preferably an alkaline electrolytic solution including KOH, NaOH, LiOH, or the like as a solute.

The material of the separator 28 can be, for example, a non-woven cloth made of fibers of polyamide, to which a hydrophilic functional group is imparted, or a non-woven cloth made of fibers of polyolefin such as polyethylene or polypropylene, to which a hydrophilic functional group is imparted.

The positive electrode 24 includes a positive electrode substrate and a positive electrode mixture supported on the positive electrode substrate.

The positive electrode substrate is formed by a conductive material having a three-dimensional network structure. The positive electrode substrate here used can be, specifically, a mesh, spongy or fibrous metal object nickel-plated, or foamed nickel.

The positive electrode mixture includes a positive electrode active material particle, a positive electrode additive, a conductive material and a binder. The binder serves to bind the constituent materials of the positive electrode mixture to the positive electrode substrate. The binder can be, for example, carboxymethylcellulose, methylcellulose, a PTFE (polytetrafluoroethylene) dispersion, or an HPC (hydroxypropylcellulose) dispersion.

The positive electrode active material particle used is a nickel hydroxide particle or a high-order nickel hydroxide particle. Such a nickel hydroxide particle is preferably, if necessary, in the form of a solid solution with zinc or cobalt.

Examples of the conductive material can include a metal simple substance, an alloy, a conductive metal oxide, and a conductive metal hydroxide. Examples can preferably include cobalt, a cobalt alloy, and a cobalt compound (cobalt oxide and cobalt hydroxide).

The conductive material is present in the positive electrode mixture, according to at least one aspect of an aspect where the conductive material is included in the form of a particle and an aspect where the conductive material is included in the form of a conductive layer formed on the surface of the positive electrode active material particle. In other words, the conductive material is in the form of any one of the particle and the conductive layer, or in the form of both the particle and the conductive layer.

The conductive material here added in the form of the conductive layer is preferably in an amount of 2 parts by mass or more and 5 parts by mass or less per 100 parts by mass of a nickel hydroxide particle serving as a base particle. The conductive material here added in the form of the particle is preferably in an amount of 2 parts by mass or more and 5 parts by mass or less per 100 parts by mass of a nickel hydroxide particle serving as a base particle.

In the present embodiment, an aspect is adopted where not only a conductive layer including a cobalt compound is formed on the surface of the nickel hydroxide particle, but also a cobalt compound particle is added into the positive electrode mixture.

The cobalt compound particle here used is preferably, for example, a particle of cobalt hydroxide ($Co(OH)_2$), cobalt oxide (CoO), or the like, having an average particle size of 0.1 μm to 10 μm.

The average particle size in the present disclosure here refers to a volume average particle size obtained by measuring the particle size distribution on volume basis of a powder as an aggregate of an objective particle, by use of a laser diffraction/scattering particle size distribution measurement apparatus.

When the conductive material in the form of the conductive layer covering the surface of the positive electrode active material particle is included in the positive electrode mixture, the cobalt compound here used is preferably, for example, cobalt hydroxide ($Co(OH)_2$) or cobalt oxide (CoO). The thickness of the conductive layer is not particularly limited, and is preferably, for example, 0.1 μm. A Co compound having a thickness of 0.1 μm is formed, and therefore, the cobalt compound as the conductive layer is in an amount of about 2.0 parts by mass to 5.0 parts by mass per 100 parts by mass of a nickel hydroxide particle serving as a base particle.

A high-order cobalt compound such as cobalt oxyhydroxide (CoOOH) is preferably adopted as such a Co compound as the conductive layer. The high-order cobalt compound preferably contains an alkali metal. More preferably, Na is adopted as the alkali metal. Any cobalt compound containing Na is hereinafter referred to as "sodium-containing cobalt compound". The sodium-containing cobalt compound is specifically a compound where Na is incorporated into a crystal of cobalt oxyhydroxide (CoOOH). Such a cobalt compound thus containing Na is preferable because the thickness of the resulting conductive layer is increased in uniformity.

The above conductive material particle and the positive electrode active material particle are contacted with each other, or any positive electrode active materials having the conductive layer are contacted with each other, thereby forming a conductive network and thus allowing conductivity of the positive electrode to be secured, resulting in an enhancement in rate of utilization of the positive electrode active material.

Next, the positive electrode additive serves to suppress reduction of the cobalt compound and suppress breakage of the conductive network, and includes a first additive and a second additive.

The first additive is yttrium oxide, and the second additive includes at least one of niobium oxide and titanium oxide.

The total amount of the first additive and the second additive added is 0.1 parts by mass or more and 2.5 parts by mass or less per 100 parts by mass of the positive electrode active material (nickel hydroxide particle serving as a base particle).

The mass ratio of the first additive and the second additive is set so as to satisfy a relationship of X:Y=1:0.2 to 5 when the mass of the first additive is represented by X and the mass of the second additive is represented by Y.

The first additive is essentially yttrium oxide, and, if ytterbium oxide is adopted instead of yttrium oxide, discharge characteristics at a high rate of 3 C are deteriorated.

The amounts of the first additive and the second additive added can be set within the above range, thereby allowing deterioration in discharge characteristics at a high rate of 3 C to be suppressed, but the amounts of the first additive and the second additive added are out of the range, thereby causing deterioration in discharge characteristics at a high rate of 3 C.

The yttrium oxide adopted is particulate. Such an yttrium oxide particle used is not particularly limited, and preferably has an average particle size of 1 μm to 10 μm.

The niobium oxide is particulate. Such a niobium oxide particle used is not particularly limited, and preferably has an average particle size of 0.1 μm to 10 μm.

The titanium oxide is particulate. Such a titanium oxide particle used is not particularly limited, and preferably has an average particle size of 1 nm to 100 nm.

The total resistivity of the positive electrode mixture is set to 1 Ω·m or more and 10 Ω·m or less. Examples of a specific method for setting the resistivity of the positive electrode mixture within the above range include a method involving adjusting the amount of the conductive material added and the amount of the conductive material precipitated on the surface of the positive electrode active material particle.

The resistivity of the positive electrode mixture is desirably low, and 20 parts by mass or more of the conductive material per 100 parts by mass of the nickel hydroxide is required for decreasing the resistivity to less than 1 Ω·m, depending on the type of the conductive material. An increase in amount of the conductive material results in a decrease in amount of the positive electrode active material by that amount, resulting in a decrease in battery capacity. Accordingly, the resistivity of the positive electrode mixture is 1 Ω·m or more.

If the resistivity of the positive electrode mixture is more than 10 Ω·m, discharge characteristics are deteriorated. Accordingly, the resistivity of the positive electrode mixture is 10 Ω·m or less.

The positive electrode mixture is here low in conductivity in the initial state, and the resistivity thereof, achieved after an activation treatment is made to provide an available state, is set within the above range.

The positive electrode 24 can be produced, for example, as follows.

First, a positive electrode additive, a conductive material, water and a binder are added to a positive electrode active material powder as an aggregate of a positive electrode active material particle, and the resultant is kneaded to thereby prepare a positive electrode mixture slurry. The resulting positive electrode mixture slurry is, for example, packed in foamed nickel, and dried. After the drying, the foamed nickel where the positive electrode active material (nickel hydroxide particle) and the like are packed is rolled and then cut. Thus, the positive electrode 24 on which the positive electrode mixture is supported is obtained.

Next, the negative electrode 26 is described.

The negative electrode 26 has a belt-shaped conductive negative electrode core, and a negative electrode mixture is retained in the negative electrode core.

The negative electrode core is a sheet-shaped metal material where a through-hole is distributed, and, for example, a punching metal sheet can be used. The negative electrode mixture is not only packed in the through-hole of the negative electrode core, but also retained on both surfaces of the negative electrode core in a layered manner.

The negative electrode mixture includes a hydrogen storage alloy particle capable of storing and releasing hydrogen, as a negative electrode active material, a conductive material, and a binder. The binder serve to not only bind the hydrogen storage alloy particle, a negative electrode additive, and the conductive material to one another, but also bind the negative electrode mixture to the negative electrode core. The binder here used can be a hydrophilic or hydrophobic polymer, and the conductive material here used can be carbon black or graphite. The negative electrode additive may be, if necessary, added.

The hydrogen storage alloy in the hydrogen storage alloy particle is suitably one for use in a common nickel-hydrogen secondary battery.

The negative electrode 26 can be produced, for example, as follows.

First, a hydrogen storage alloy powder as an aggregate of a hydrogen storage alloy particle, a conductive material, a binder and water are kneaded to thereby prepare a negative electrode mixture paste. The resulting negative electrode mixture paste is applied to a negative electrode core, and dried. After the drying, the negative electrode core to which the hydrogen storage alloy particle and the like are attached is rolled and cut. Thus, the negative electrode 26 is produced.

The positive electrode 24 and the negative electrode 26, produced as above, are spirally wound with the separator 28 being interposed therebetween, thereby forming the electrode group 22.

The electrode group 22 thus obtained is housed in the outer can 10. Subsequently, a predetermined amount of the alkaline electrolytic solution is injected into the outer can 10. Thereafter, the outer can 10 in which the electrode group 22 and the alkaline electrolytic solution are housed is sealed by the lid plate 14 provided with the positive electrode terminal 20, thereby providing the battery 2 according to the present disclosure. The resulting battery 2 is subjected to an initial activation treatment, and thus is in an available state.

The positive electrode for an alkali secondary battery according to the present disclosure includes a positive electrode substrate and a positive electrode mixture supported on the positive electrode substrate, and the positive electrode mixture includes nickel hydroxide serving as a positive electrode active material, a positive electrode additive, and a conductive material. The nickel hydroxide includes at least one of nickel oxyhydroxide and nickel hydroxide. The above positive electrode additive includes a first additive and a second additive, and the first additive is yttrium oxide and the second additive includes at least one of niobium oxide and titanium oxide. The total amount of the first additive and the second additive is 0.1 parts by mass or more and 2.5 parts by mass or less per 100 parts by mass of the nickel hydroxide, and the mass ratio of the first additive and the second additive is in a relationship of $X:Y=1:0.2$ to 5 when the mass of the first additive is X and the mass of the second additive is Y. The resistivity of the positive electrode mixture after an activation treatment is set to 1 Ω·m or more and 10 Ω·m or less. Such a positive electrode not only enables breakage of a conductive network to be suppressed, but also enables deterioration in discharge characteristics at a high rate to be suppressed. An alkali secondary battery including such a positive electrode can be discharged at a high rate.

In other words, the present disclosure can provide an excellent alkali secondary battery which can be suppressed in deterioration in discharge characteristics at a high rate even when a positive electrode additive for retention of a conductive network is contained.

EXAMPLES

Production of Battery

Example 1

Production of Positive Electrode

Nickel sulfate, zinc sulfate and cobalt sulfate were weighed so that the rate of zinc and that of cobalt relative to nickel were 3% by mass and 1% by mass, respectively, and added to an aqueous 1 N sodium hydroxide solution including ammonium ions, thereby preparing a mixed aqueous solution. While the resulting mixed aqueous solution was stirred, an aqueous 10 N sodium hydroxide solution was gradually added to the mixed aqueous solution to allow a reaction to occur, and the pH in the reaction was stabilized to 13 to 14, thereby producing a base particle in the form of a solid solution with zinc and cobalt, mainly containing nickel hydroxide.

The resulting base particle was washed with pure water in an amount of 10-fold, three times, and thereafter dewatered and dried. The resulting base particle had a spherical shape having an average particle size of 10 μm.

Next, the resulting base particle was loaded to an aqueous ammonia solution, and an aqueous cobalt sulfate solution was added thereto with the pH in the reaction being kept at 9 to 10. Thus, the base particle served as a nucleus and cobalt hydroxide was precipitated on the surface of the nucleus, thereby providing an intermediate particle including a cobalt hydroxide layer having a thickness of about 0.1 μm. Next, the intermediate particle was convected in high-temperature air containing oxygen under an environment at 80° C., and was subjected to a heat treatment for 45 minutes. Thus, the cobalt hydroxide on the surface of the intermediate particle was converted to cobalt oxyhydroxide high in conductivity. In other words, a conductive layer of cobalt oxyhydroxide was formed. Thereafter, a particle including such a conductive layer of cobalt oxyhydroxide was collected by filtration, washed with water and then dried at 60° C. Thus, a positive electrode active material powder as an aggregate of a positive electrode active material particle was obtained which had a conductive layer of cobalt oxyhydroxide on the surface of a base particle.

The conductive layer of cobalt oxyhydroxide had a thickness of about 0.1 μm, and was in an amount of 4.0 parts by mass per 100 parts by mass of the base particle.

Next, an yttrium oxide powder as an aggregate of an yttrium oxide particle having an average particle size of 5.0 μm, and a niobium oxide powder as an aggregate of a niobium oxide particle having an average particle size of 3.0 μm were prepared.

A cobalt hydroxide powder as an aggregate of a cobalt hydroxide ($Co(OH)_2$) particle having an average particle size of 1.0 μm was prepared as a conductive material separately added.

Next, 104 parts by mass of the positive electrode active material powder (including 100 parts by mass of the base particle as nickel hydroxide and 4 parts by mass of cobalt oxyhydroxide as the conductive layer.) was mixed with 0.3 parts by mass of the yttrium oxide powder (first additive), 0.6 parts by mass of the niobium oxide powder (second additive), 3.0 parts by mass of the cobalt hydroxide powder (conductive material separately added), 0.2 parts by mass of an HPC powder, 0.3 parts by mass of a PTFE dispersion liquid and 30 parts by mass of water, thereby preparing a positive electrode active material slurry, and the positive electrode active material slurry was packed in foamed nickel as a positive electrode substrate, and then dried. Thus, an intermediate product of a positive electrode was obtained in which a positive electrode active material particle and the like were packed in foamed nickel.

The resulting intermediate product was rolled so as to have a thickness of 0.52 mm, and thereafter cut to a predetermined dimension, thereby providing a positive electrode 24 for AA size.

(2) Production of Hydrogen Storage Alloy and Negative Electrode

First, a rare-earth component including 12% by mass of La and 88% by mass of Sm was prepared. The resulting rare-earth component, Mg, Ni, and Al were weighed, and a mixture was prepared where the molar ratio thereof was 0.90:0.10:3.40:0.10. The resulting mixture was molten in an induction melting furnace, and the melt was poured into a mold and then cooled to room temperature (about 25° C.), thereby providing a hydrogen storage alloy ingot.

Next, the ingot was subjected to a heat treatment for retention under an argon gas atmosphere at a temperature of 1000° C. for 10 hours. After the heat treatment, the ingot was cooled to room temperature (about 25° C.). A sample was collected from the ingot after the heat treatment, and was subjected to compositional analysis according to an inductivity coupled plasma optical emission spectrometric method (ICP). As a result, the composition of the hydrogen storage alloy was $(La_{0.12}Sm_{0.88})_{0.90}Mg_{0.10}Ni_{3.40}Al_{0.10}$.

Next, the hydrogen storage alloy ingot after the heat treatment was pulverized in an argon gas atmosphere, thereby providing a hydrogen storage alloy powder as an aggregate of a hydrogen storage alloy particle. The resulting hydrogen storage alloy powder was subjected to particle size measurement with a laser diffraction/scattering particle size distribution measurement apparatus, and as a result, the hydrogen storage alloy particle had a volume average particle size (MV) of 60 μm.

To 100 parts by mass of the resulting hydrogen storage alloy powder were added 0.4 parts by mass of a sodium polyacrylate powder, 0.1 parts by mass of a carboxymethylcellulose powder, 1.0 part by mass (in terms of solid content) of a styrene/butadiene rubber (SBR) dispersion (solid content: 50% by mass), 1.0 part by mass of a carbon black powder, and 30 parts by mass of water, and the resultant was kneaded, thereby preparing a negative electrode mixture paste.

Both surfaces of a perforated plate made of iron, as a negative electrode core, were uniformly coated with the negative electrode mixture paste so that the thickness was constant. The perforated plate had a thickness of 60 μm, and the surfaces thereof were nickel-plated.

After the paste was dried, the perforated plate to which the hydrogen storage alloy powder was attached was further rolled to result in an increase in amount per volume of the alloy, and then cut, thereby providing a negative electrode 26 for AA size.

(3) Production of Nickel-Hydrogen Secondary Battery

The resulting positive electrode 24 and negative electrode 26 were spirally wound with a separator 28 being interposed therebetween, thereby producing an electrode group 22. The separator 28 here used in production of the electrode group 22 was a sulfonated separator obtained by sulfonating a non-woven cloth made of fibers of polypropylene, by oleum pyrosulfuric acid, and then neutralizing the resultant by an aqueous sodium hydroxide solution, and had a thickness of 0.14 mm (mass per unit area: 60 g/m$^2$).

KOH, NaOH and LiOH were weighed, and such KOH, NaOH and LiOH were loaded to ion exchange water, thereby preparing an alkaline electrolytic solution having a total concentration of 7.0 N and containing 5.0 N of KOH, 1.0 N of NaOH and 1.0 N of LiOH and thus mainly containing KOH.

Next, the electrode group 22 was accommodated in a bottomed cylindrical outer can 10, and 2.2 ml of the alkaline electrolytic solution prepared was poured thereinto. Thereafter, the opening of the outer can 10 was plugged by a sealing body 11, thereby producing an AA-size nickel-hydrogen secondary battery 2 having a nominal capacity of 1100 mAh.

(4) Initial Activation Treatment

The battery 2 was subjected to an initial activation treatment by repeatedly performing a charge/discharge operation five times, the operation including charge at 0.2 C for 16 hours and discharge to a battery voltage of 1.0 V at 0.2 C, under an environment at a temperature of 25° C. The battery 2 was thus in an available state.

(5) Measurement of Resistivity of Positive Electrode Mixture

A plurality of such batteries 2 were produced for evaluation of characteristics and measurement of the resistivity of the positive electrode mixture. Such any battery for measurement of the resistivity of the positive electrode mixture was disassembled after the initial activation treatment, the positive electrode mixture was recovered, and the resistivity of the positive electrode mixture was measured. A detailed procedure is shown below.

The battery after the last discharge (discharge to a battery voltage of 1.0 V at 0.2 C) in the initial activation treatment was disassembled, and the positive electrode was taken out from the battery. The positive electrode was washed with water for removal of the alkaline electrolytic solution therefrom. The positive electrode after washing with water was housed in a constant-temperature bath at 60° C., and dried for 12 hours to 18 hours. The positive electrode after drying was subjected to ultrasonic vibration for peeling the positive electrode mixture. Next, the positive electrode mixture peeled was sieved to remove any fragment of the positive electrode substrate, thereby providing a powder of only the positive electrode mixture. Only 1.0 g of the resulting powder of the positive electrode mixture was weighed and taken, and adopted as a sample S for resistivity measurement. The sample S was installed in a resistivity measurement apparatus 40 described below, and the resistivity of the sample S was measured. A detailed measurement procedure is shown below.

Figure 2:
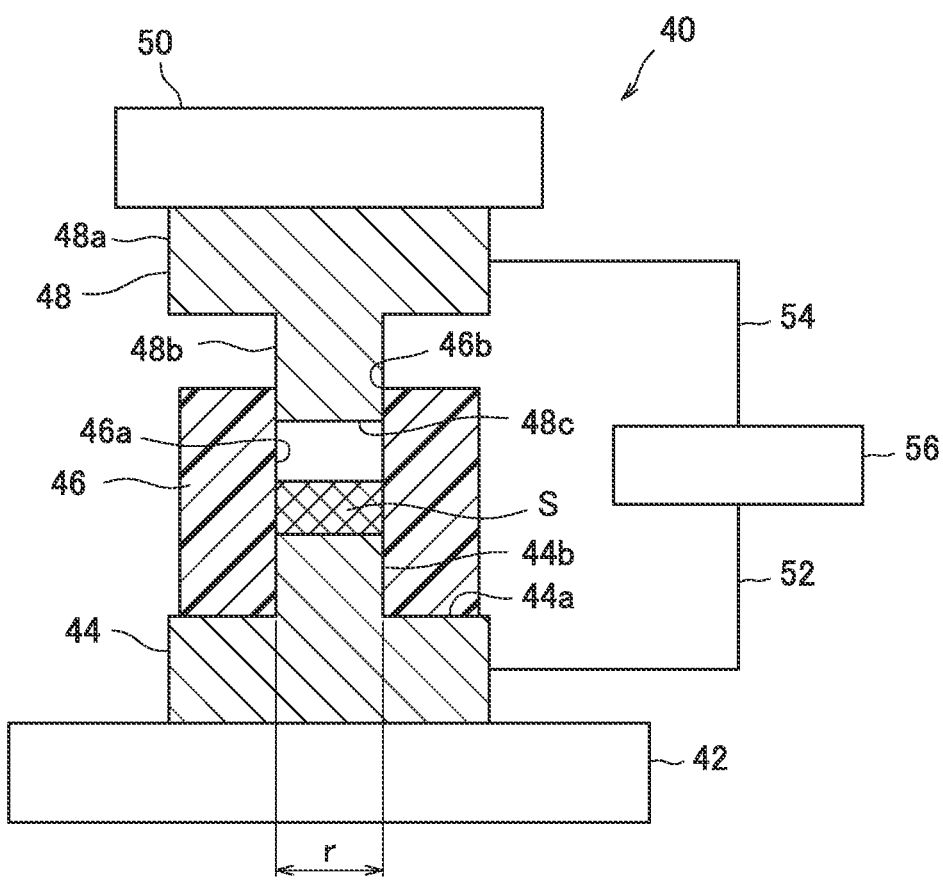
FIG. 2 is a configuration view schematically illustrating a resistivity measurement apparatus.

The resistivity measurement apparatus 40 includes a lower tool 44 made of copper, mounted on a stand 42, a cylindrical body 46 formed from an insulating resin, an upper tool 48 made of copper, the upper tool 48 being located opposite to the lower tool 44, a pressing machine 50 for pushing the upper tool 48 towards the lower tool 44, and a digital multi-meter 56 attached to the lower tool 44 and the upper tool 48 via lead wires 52 and 54, respectively, as illustrated in FIG. 2.

The lower tool 44 includes a disc-shaped base section 44a and a columnar lower contact section 44b provided at the center of the base section 44a. The outer dimension r of the lower contact section 44b is the same as the inner dimension of a central through-hole 46a of the body 46, and the lower contact section 44b is inserted into the central through-hole 46a of the body 46. The outer dimension r of the lower contact section 44b is 15 mm.

The upper tool 48 includes a disc-shaped base section 48a and a columnar upper contact section 48b provided at the center of the base section 48a. The outer dimension of the upper contact section 48b is the same as the inner dimension of the central through-hole 46a of the body 46, and the upper contact section 48b is inserted into the central through-hole 46a of the body 46. The outer dimension of the upper contact section 48b is also 15 mm.

The sample S is disposed on the lower contact section 44b of the lower tool 44 in the body 46. The upper contact section 48b of the upper tool 48 is inserted from an opening 46b at an upper end of the central through-hole 46a of the body 46, and an end surface 48c of the upper contact section 48b is contacted with the sample S. While such a state was kept, the pressing machine 50 was operated to push the upper tool 48 towards the lower tool 44, thereby compressing the sample S and also measuring the resistivity of the sample S by the digital multi-meter 56. The sample S was here compressed at a power of 10 kN in resistivity measurement.

Example 2

A nickel-hydrogen secondary battery 2 in an available state was produced in the same manner as in Example 1 except that the amount of yttrium oxide added as the first additive was 0.5 parts by mass.

Example 3

A nickel-hydrogen secondary battery 2 in an available state was produced in the same manner as in Example 1 except that the amount of yttrium oxide added as the first additive was 0.9 parts by mass.

Comparative Example 1

A nickel-hydrogen secondary battery 2 in an available state was produced in the same manner as in Example 1 except that the amount of yttrium oxide added as the first additive was 0 parts by mass, namely, no first additive was used.

Comparative Example 2

A nickel-hydrogen secondary battery 2 in an available state was produced in the same manner as in Example 1 except that the amount of yttrium oxide added as the first additive was 3 parts by mass.

Comparative Examples 3 to 5

Each nickel-hydrogen secondary battery 2 in an available state was produced in the same manner as in Example 1 except that ytterbium oxide was used as the first additive instead of yttrium oxide and the amount thereof added was changed to 0 parts by mass, 1.5 parts by mass or 3 parts by mass. The ytterbium oxide here used was an ytterbium oxide powder as an aggregate of an ytterbium oxide particle having an average particle size of 8.0 μm. Much the same is true on ytterbium oxides for use in the following Comparative Examples.

Examples 4 to 6

Each nickel-hydrogen secondary battery 2 in an available state was produced in the same manner as in Example 1 except that the amount of yttrium oxide added as the first additive was 0.9 parts by mass and the amount of niobium oxide added as the second additive was changed to 0.6 parts by mass, 1.2 parts by mass or 1.5 parts by mass.

Comparative Examples 6 and 7

Each nickel-hydrogen secondary battery 2 in an available state was produced in the same manner as in Example 1 except that the amount of yttrium oxide added as the first additive was 0.9 parts by mass and the amount of niobium oxide added as the second additive was 0 parts by mass or 2 parts by mass.

Comparative Examples 8 to 12

Each nickel-hydrogen secondary battery 2 in an available state was produced in the same manner as in Example 1 except that ytterbium oxide was used as the first additive instead of yttrium oxide and the amount thereof added was 1.5 parts by mass, and titanium oxide was used as the second additive instead of niobium oxide and the amount thereof added was changed to 0 parts by mass, 0.1 parts by mass, 0.5 parts by mass, 1 part by mass or 2 parts by mass. The titanium oxide here used was a titanium oxide powder as an aggregate of a titanium oxide particle having an average particle size of 5 nm. Much the same is true on titanium oxides for use in the following Examples and Comparative Examples.

Examples 7 to 9

Each nickel-hydrogen secondary battery 2 in an available state was produced in the same manner as in Example 1 except that the amount of yttrium oxide added as the first additive was 0.9 parts by mass, and titanium oxide was used as the second additive instead of niobium oxide and the amount thereof added was changed to 0.2 parts by mass, 0.5 parts by mass or 1 part by mass.

Comparative Examples 13 and 14

Each nickel-hydrogen secondary battery 2 in an available state was produced in the same manner as in Example 1 except that the amount of yttrium oxide added as the first additive was 0.9 parts by mass, and titanium oxide was used as the second additive instead of niobium oxide and the amount thereof added was changed to 0 parts by mass or 2 parts by mass.

Comparative Example 15

A nickel-hydrogen secondary battery 2 in an available state was produced in the same manner as in Example 1 except that no first additive was added, titanium oxide was used as the second additive instead of niobium oxide and the amount thereof added was 0.5 parts by mass, no conductive layer of cobalt oxyhydroxide was formed on the surface of the base particle as nickel hydroxide, and 3.3 parts by mass of the cobalt hydroxide powder as the conductive material separately added was added.

Comparative Examples 16 to 18

Each nickel-hydrogen secondary battery 2 in an available state was produced in the same manner as in Example 1 except that no first additive was added, titanium oxide was used as the second additive instead of niobium oxide and the amount thereof added was 0.5 parts by mass, and the amount of the cobalt hydroxide powder added as the conductive material separately added was changed to 0.5 parts by mass, 3.0 parts by mass or 15.0 parts by mass.

Comparative Example 19

A nickel-hydrogen secondary battery 2 in an available state was produced in the same manner as in Example 1 except that the amount of yttrium oxide added as the first additive was 0.9 parts by mass, titanium oxide was used as the second additive instead of niobium oxide and the amount thereof added was 0.5 parts by mass, no conductive layer of cobalt oxyhydroxide was formed on the surface of the base particle as nickel hydroxide, and 3.3 parts by mass of the cobalt hydroxide powder as the conductive material separately added was added.

Examples 10 to 14

Each nickel-hydrogen secondary battery 2 in an available state was produced in the same manner as in Example 1 except that the amount of yttrium oxide added as the first additive was 0.9 parts by mass, titanium oxide was used as the second additive instead of niobium oxide and the amount thereof added was 0.5 parts by mass, and the amount of the cobalt hydroxide powder as the conductive material separately added was changed to 0 parts by mass, 0.5 parts by mass, 1.0 part by mass, 3.0 parts by mass or 15.0 parts by mass.

Comparative Example 20

A nickel-hydrogen secondary battery 2 in an available state was produced in the same manner as in Example 1 except that the amount of yttrium oxide added as the first additive was 1.8 parts by mass, titanium oxide was used as the second additive instead of niobium oxide and the amount thereof added was 0.5 parts by mass, no conductive layer of cobalt oxyhydroxide was formed on the surface of the base particle as nickel hydroxide, and 3.3 parts by mass of the cobalt hydroxide powder as the conductive material separately added was added.

Examples 15 to 17

Each nickel-hydrogen secondary battery 2 in an available state was produced in the same manner as in Example 1 except that the amount of yttrium oxide added as the first additive was 1.8 parts by mass, titanium oxide was used as the second additive instead of niobium oxide and the amount thereof added was 0.5 parts by mass, and the amount of the cobalt hydroxide powder added as the conductive material separately added was changed to 0.5 parts by mass, 3.0 parts by mass or 15.0 parts by mass.

Comparative Example 21

A nickel-hydrogen secondary battery 2 in an available state was produced in the same manner as in Example 1 except that the amount of yttrium oxide added as the first additive was 3 parts by mass, titanium oxide was used as the second additive instead of niobium oxide and the amount thereof added was 0.5 parts by mass, no conductive layer of cobalt oxyhydroxide was formed on the surface of the base particle as nickel hydroxide, and 3.3 parts by mass of the cobalt hydroxide powder as the conductive material separately added was added.

Comparative Examples 22 to 24

Each nickel-hydrogen secondary battery 2 in an available state was produced in the same manner as in Example 1 except that the amount of yttrium oxide added as the first additive was 3 parts by mass, titanium oxide was used as the second additive instead of niobium oxide and the amount thereof added was 0.5 parts by mass, and the amount of the cobalt hydroxide powder added as the conductive material separately added was changed to 0.5 parts by mass, 3.0 parts by mass or 15.0 parts by mass.

2. Evaluation of Nickel-Hydrogen Secondary Battery

Rate of Utilization of Ni

Each of the batteries of Examples 1 to 17 and Comparative Examples 1 to 24, which was for evaluation of characteristics and was subjected to the initial activation treatment, was charged to 160% of the nominal capacity by a charge current of 0.1 C applied under an environment of 25° C., and thereafter was left to still stand for 60 minutes. Next, the resultant was discharged to a battery voltage of 1.0 V at 0.2

C under the same environment. The discharge capacity of such each battery here was measured. The discharge capacity here was defined as the initial capacity. The rate of utilization of Ni was calculated from 289 mAh/g as a capacity value per gram of nickel hydroxide included in the positive electrode, and the resulting initial capacity. The results were each described as the rate of utilization of Ni in each Table. The rate of utilization of Ni substantially indicates the rate of utilization of the positive electrode active material.

(2) Discharge Characteristics

Each of the batteries of Examples 1 to 17 and Comparative Examples 1 to 24, which was for evaluation of characteristics and was subjected to the initial activation treatment, was charged to 160% of the nominal capacity by a charge current of 0.1 C applied under an environment of 25° C., and thereafter was left to still stand for 60 minutes. Next, the resultant was discharged to a battery voltage of 1.0 V at 0.2 C under the same environment. The discharge capacity of such each battery here was measured. The discharge capacity here was defined as the capacity at 0.2 C.

Next, each of the batteries of Examples 1 to 17 and Comparative Examples 1 to 24 was charged to 160% of the nominal capacity by a charge current of 0.1 C applied under an environment of 25° C., and thereafter was left to still stand for 60 minutes. Next, the resultant was discharged to a battery voltage of 1.0 V at 1 C under the same environment. The discharge capacity of such each battery here was measured. The discharge capacity here was defined as the capacity at 1 C.

The ratio of the discharge capacity in discharge at 1 C to the discharge capacity in discharge at 0.2 C (capacity ratio of 1 C/0.2 C) was determined according to the following expression (I).

Capacity ratio of 1 C/0.2 C [%]=Capacity at 1 C/Capacity at 0.2 C×100  (I)

The capacity ratio of 1 C/0.2 C was shown in each Table.

Next, each of the batteries of Examples 1 to 17 and Comparative Examples 1 to 24 was charged to 160% of the nominal capacity by a charge current of 0.1 C applied under an environment of 25° C., and thereafter was left to still stand for 60 minutes. Next, the resultant was discharged to a battery voltage of 1.0 V at 3 C under the same environment. The discharge capacity of such each battery here was measured. The discharge capacity here was defined as the capacity at 3 C.

The ratio of the discharge capacity in discharge at 3 C to the discharge capacity in discharge at 0.2 C (capacity ratio of 3 C/0.2 C) was determined according to the following expression (II).

Capacity ratio of 3 C/0.2 C [%]=Capacity at 3 C/Capacity at 0.2×100  (II)

The capacity ratio of 3 C/0.2 C was shown in each Table.

TABLE 1

| | First additive [parts by mass] | | Second additive [parts by mass] | | Co compound [parts by mass] on active material surface | Co(OH)$_2$ [parts by mass] separately added | Rate of utilization of Ni [%] | Capacity ratio of 1 C/0.2 C [%] | Capacity ratio of 3 C/0.2 C [%] | Resistivity [Ω·m] |
|---|---|---|---|---|---|---|---|---|---|---|
| | Y$_2$O$_3$ | Yb$_2$O$_3$ | Nb$_2$O$_5$ | TiO$_2$ | | | | | | |
| Comparative Example 1 | 0 | — | 0.6 | — | 4.0 | 3.0 | 99.8 | 94.5 | 85.7 | 5.3 |
| Example 1 | 0.3 | — | 0.6 | — | 4.0 | 3.0 | 102.2 | 95.6 | 90.4 | 5.4 |
| Example 2 | 0.5 | — | 0.6 | — | 4.0 | 3.0 | 103.0 | 95.9 | 91.0 | 5.3 |
| Example 3 | 0.9 | — | 0.6 | — | 4.0 | 3.0 | 103.2 | 96.0 | 91.3 | 5.6 |
| Comparative Example 2 | 3 | — | 0.6 | — | 4.0 | 3.0 | 102.2 | 95.0 | 89.5 | 5.5 |
| Comparative Example 3 | — | 0 | 0.6 | — | 4.0 | 3.0 | 99.8 | 94.5 | 85.7 | 5.7 |
| Comparative Example 4 | — | 1.5 | 0.6 | — | 4.0 | 3.0 | 101.8 | 94.7 | 87.9 | 5.6 |
| Comparative Example 5 | — | 3 | 0.6 | — | 4.0 | 3.0 | 102.9 | 95.5 | 88.8 | 5.8 |

TABLE 2

| | First additive [parts by mass] | | Second additive [parts by mass] | | Co compound [parts by mass] on active material surface | Co(OH)$_2$ [parts by mass] separately added | Rate of utilization of Ni [%] | Capacity ratio of 1 C/0.2 C [%] | Capacity ratio of 3 C/0.2 C [%] | Resistivity [Ω·m] |
|---|---|---|---|---|---|---|---|---|---|---|
| | Y$_2$O$_3$ | Yb$_2$O$_3$ | Nb$_2$O$_5$ | TiO$_2$ | | | | | | |
| Comparative Example 6 | 0.9 | — | 0 | — | 4.0 | 3.0 | 102.8 | 95.6 | 86.8 | 5.2 |
| Example 4 | 0.9 | — | 0.6 | — | 4.0 | 3.0 | 103.2 | 96.0 | 91.3 | 5.4 |
| Example 5 | 0.9 | — | 1.2 | — | 4.0 | 3.0 | 102.2 | 95.6 | 90.4 | 5.3 |
| Example 6 | 0.9 | — | 1.5 | — | 4.0 | 3.0 | 101.8 | 95.6 | 90.1 | 5.5 |
| Comparative Example 7 | 0.9 | — | 2 | — | 4.0 | 3.0 | 101.7 | 94.8 | 89.1 | 5.8 |
| Comparative Example 8 | — | 1.5 | — | 0 | 4.0 | 3.0 | 91.3 | 94.7 | 85.5 | 5.2 |
| Comparative Example 9 | — | 1.5 | — | 0.1 | 4.0 | 3.0 | 101.0 | 96.3 | 88.7 | 5.3 |

TABLE 2-continued

| | First additive [parts by mass] | | Second additive [parts by mass] | | Co compound [parts by mass] on active material surface | Co (OH)$_2$ [parts by mass] separately added | Rate of utilization of Ni [%] | Capacity ratio of 1 C/0.2 C [%] | Capacity ratio of 3 C/0.2 C [%] | Resistivity [Ω · m] |
|---|---|---|---|---|---|---|---|---|---|---|
| | Y$_2$O$_3$ | Yb$_2$O$_3$ | Nb$_2$O$_5$ | TiO$_2$ | | | | | | |
| Comparative Example 10 | — | 1.5 | — | 0.5 | 4.0 | 3.0 | 102.2 | 96.6 | 88.9 | 5.6 |
| Comparative Example 11 | — | 1.5 | — | 1 | 4.0 | 3.0 | 101.2 | 96.4 | 88.7 | 5.4 |
| Comparative Example 12 | — | 1.5 | — | 2 | 4.0 | 3.0 | 99.5 | 95.3 | 87.1 | 5.7 |

TABLE 3

| | First additive [parts by mass] | | Second additive [parts by mass] | | Co compound [parts by mass] on active material surface | Co (OH)$_2$ [parts by mass] separately added | Rate of utilization of Ni [%] | Capacity ratio of 1 C/0.2 C [%] | Capacity ratio of 3 C/0.2 C [%] | Resistivity [Ω · m] |
|---|---|---|---|---|---|---|---|---|---|---|
| | Y$_2$O$_3$ | Yb$_2$O$_3$ | Nb$_2$O$_5$ | TiO$_2$ | | | | | | |
| Comparative Example 13 | 0.9 | — | — | 0 | 4.0 | 3.0 | 102.8 | 95.6 | 86.8 | 5.1 |
| Example 7 | 0.9 | — | — | 0.2 | 4.0 | 3.0 | 100.6 | 95.0 | 90.3 | 5.2 |
| Example 8 | 0.9 | — | — | 0.5 | 4.0 | 3.0 | 101.5 | 95.2 | 90.6 | 5.3 |
| Example 9 | 0.9 | — | — | 1 | 4.0 | 3.0 | 101.5 | 95.3 | 90.0 | 5.2 |
| Comparative Example 14 | 0.9 | — | — | 2 | 4.0 | 3.0 | 99.6 | 94.8 | 88.5 | 5.3 |

TABLE 4

| | First additive [parts by mass] | | Second additive [parts by mass] | | Co compound [parts by mass] on active material surface | Co (OH)$_2$ [parts by mass] separately added | Rate of utilization of Ni [%] | Capacity ratio of 1 C/0.2 C [%] | Capacity ratio of 3 C/0.2 C [%] | Resistivity [Ω · m] |
|---|---|---|---|---|---|---|---|---|---|---|
| | Y$_2$O$_3$ | Yb$_2$O$_3$ | Nb$_2$O$_5$ | TiO$_2$ | | | | | | |
| Comparative Example 15 | 0 | — | — | 0.5 | 0.0 | 3.3 | 70.7 | 86.4 | 72.6 | 20.7 |
| Comparative Example 16 | 0 | — | — | 0.5 | 4.0 | 0.5 | 101.2 | 95.1 | 74.2 | 9.7 |
| Comparative Example 17 | 0 | — | — | 0.5 | 4.0 | 3.0 | 101.5 | 95.8 | 80.8 | 5.3 |
| Comparative Example 18 | 0 | — | — | 0.5 | 4.0 | 15.0 | 101.3 | 96.2 | 81.7 | 1.9 |
| Comparative Example 19 | 0.9 | — | — | 0.5 | 0.0 | 3.3 | 85.3 | 86.3 | 77.6 | 21.1 |
| Example 10 | 0.9 | — | — | 0.5 | 4.0 | 0 | 101.6 | 95.3 | 90.2 | 10.0 |
| Example 11 | 0.9 | — | — | 0.5 | 4.0 | 0.5 | 101.6 | 95.0 | 90.1 | 9.8 |
| Example 12 | 0.9 | — | — | 0.5 | 4.0 | 1.0 | 101.5 | 95.0 | 90.4 | 8.7 |
| Example 13 | 0.9 | — | — | 0.5 | 4.0 | 3.0 | 101.3 | 95.3 | 91.5 | 5.4 |
| Example 14 | 0.9 | — | — | 0.5 | 4.0 | 15.0 | 101.7 | 96.3 | 91.0 | 1.9 |
| Comparative Example 20 | 1.8 | — | — | 0.5 | 0.0 | 3.3 | 70.1 | 85.9 | 77.1 | 21.9 |
| Example 15 | 1.8 | — | — | 0.5 | 4.0 | 0.5 | 101.3 | 94.6 | 90.0 | 9.8 |
| Example 16 | 1.8 | — | — | 0.5 | 4.0 | 3.0 | 101.2 | 94.1 | 90.5 | 5.4 |
| Example 17 | 1.8 | — | — | 0.5 | 4.0 | 15.0 | 101.5 | 95.1 | 90.4 | 2.0 |
| Comparative Example 21 | 3 | — | — | 0.5 | 0.0 | 3.3 | 70.4 | 84.9 | 72.1 | 21.9 |
| Comparative Example 22 | 3 | — | — | 0.5 | 4.0 | 0.5 | 101.3 | 95.0 | 73.1 | 9.9 |
| Comparative Example 23 | 3 | — | — | 0.5 | 4.0 | 3.0 | 101.2 | 94.9 | 80.2 | 5.5 |
| Comparative Example 24 | 3 | — | — | 0.5 | 4.0 | 15.0 | 101.6 | 96.1 | 81.5 | 2.0 |

(3) Discussion

It was found from the above results that, in the case of use of yttrium oxide as the first additive, the capacity ratio of 1 C/0.2 C was 94.1% or more and the capacity ratio of 3 C/0.2 C was 90.0% or more, and deterioration in discharge characteristics was suppressed even in discharge at a high rate.

On the other hand, in the case of no use of any first additive or in the case of use of ytterbium oxide as the first additive, the capacity ratio of 1 C/0.2 C was from the 80% level to the 90% level, but the capacity ratio of 3 C/0.2 C was decreased to the 70% level. In other words, it was found that, in the case of no use of any first additive or in the case of use of ytterbium oxide as the first additive, discharge characteristics were deteriorated in discharge at a high rate.

It can be thus said that use of yttrium oxide as the first additive is effective for suppressing deterioration in discharge characteristics at a high rate.

Comparative Example 6 and Comparative Example 13 where no second additive was added caused the capacity ratio of 3 C/0.2 C to be decreased to 86.8%. It can be thus said that only yttrium oxide as the first additive cannot suppress deterioration in discharge characteristics at a high rate and niobium oxide or titanium oxide is required as the second additive.

Examples 1 to 17 falling within the following conditions: the total amount of the first additive and the second additive was 0.1 parts by mass or more and 2.5 parts by mass or less per 100 parts by mass of the nickel hydroxide and the mass ratio of the first additive and the second additive was in a relationship of 1:0.2 to 5, and the resistivity of the positive electrode mixture was 1 Ω·m or more and 10 Ω·m or less; each exhibited a capacity ratio of 3 C/0.2 C, of 90.0% or more.

On the contrary, Comparative Examples 1 to 24 not falling within the above conditions each exhibited a capacity ratio of 3 C/0.2 C, of 89.5% or less, and in particular, Comparative Examples 15, 19, 20 and 21 where the resistivity of the positive electrode mixture was more than 20 Ω·m each exhibited a capacity ratio of 3 C/0.2 C, of 77.6% to 72.1%.

It can be thus said that setting within the above conditions is effective for suppressing deterioration in discharge characteristics at a high rate.

The present disclosure is not limited to the above nickel-hydrogen secondary battery, can be variously modified and may provide, for example, any other alkali secondary battery such as a nickel-cadmium secondary battery.

<Aspect of Present Disclosure>

A first aspect of the present disclosure relates to a positive electrode for an alkali secondary battery, including a positive electrode substrate and a positive electrode mixture supported on the positive electrode substrate, wherein the positive electrode mixture includes nickel hydroxide serving as a positive electrode active material, a positive electrode additive, and a conductive material, the positive electrode additive includes a first additive and a second additive, the total amount of the first additive and the second additive is 0.1 parts by mass or more and 2.5 parts by mass or less per 100 parts by mass of the nickel hydroxide, the mass ratio of the first additive and the second additive is in a relationship of X:Y=1:0.2 to 5 when the mass of the first additive is X and the mass of the second additive is Y, the positive electrode mixture after an activation treatment has a resistivity of 1 Ω·m or more and 10 Ω·m or less, the nickel hydroxide includes at least one of nickel oxyhydroxide and nickel hydroxide, the first additive is yttrium oxide, and the second additive includes at least one of niobium oxide and titanium oxide.

A second aspect of the present disclosure relates to the positive electrode for an alkali secondary battery according to the first aspect of the present disclosure, wherein the conductive material is included in the positive electrode mixture, in the form of at least one of a particle thereof and a surface layer formed on a particle surface of the nickel hydroxide.

A third aspect of the present disclosure relates to an alkali secondary battery including an outer can and an electrode group that is housed in the outer can together with an alkaline electrolytic solution, wherein the electrode group includes a positive electrode and a negative electrode stacked with a separator being interposed therebetween, and the positive electrode is the positive electrode for an alkali secondary battery according to the first aspect or the second aspect of the present disclosure.

A fourth aspect of the present disclosure relates to the alkali secondary battery according to the third aspect of the present disclosure, wherein the negative electrode includes a hydrogen storage alloy capable of storing and releasing hydrogen, as a negative electrode active material.

EXPLANATION OF REFERENCE SIGNS 2 nickel-hydrogen secondary battery
10 outer can
22 electrode group
24 positive electrode
26 negative electrode
28 separator
40 resistivity measurement apparatus

The invention claimed is:

1. A positive electrode for an alkali secondary battery, comprising:
   a positive electrode substrate; and
   a positive electrode mixture supported on the positive electrode substrate,
   wherein:
   the positive electrode mixture comprises nickel hydroxide serving as a positive electrode active material, a positive electrode additive, and a conductive material,
   the conductive material is a cobalt compound, and comprised in the positive electrode mixture, in the form of a particle thereof and a surface layer formed on a particle surface of the nickel hydroxide,
   the positive electrode additive comprises a first additive and a second additive,
   a total amount of the first additive and the second additive is 0.1 parts by mass or more and 2.5 parts by mass or less per 100 parts by mass of the nickel hydroxide,
   a mass ratio of the first additive and the second additive is in a relationship of X:Y=1:0.2 to 5 when a mass of the first additive is X and a mass of the second additive is Y,
   the positive electrode mixture after an activation treatment has a resistivity of 1 Ω·m or more and 10 Ω·m or less,
   the nickel hydroxide comprises at least one of nickel oxyhydroxide or nickel hydroxide,
   the first additive is yttrium oxide,
   the second additive is titanium oxide, and
   an amount of the conductive material is less than 20 parts by mass per 100 parts by mass of the nickel hydroxide.

2. An alkali secondary battery comprising:
an outer can; and
an electrode group that is housed in the outer can together with an alkaline electrolytic solution,
wherein:
the electrode group comprises a positive electrode and a negative electrode stacked with a separator being interposed therebetween, and
the positive electrode is the positive electrode for an alkali secondary battery according to claim 1.

3. The alkali secondary battery according to claim 2, wherein the negative electrode comprises a hydrogen storage alloy capable of storing and releasing hydrogen, as a negative electrode active material.

* * * * *